United States Patent [19]

Yamada et al.

[11] Patent Number: 4,788,569
[45] Date of Patent: Nov. 29, 1988

[54] DISPLAY DEVICE FOR USE IN A PHOTOGRAPHIC CAMERA

[75] Inventors: Akira Yamada; Yoshihiko Aihara, both of Yokohama, Japan

[73] Assignee: Canon Kabushiki Kaisha, Tokyo, Japan

[21] Appl. No.: 41,479

[22] Filed: Apr. 23, 1987

[30] Foreign Application Priority Data

May 7, 1986 [JP] Japan .............................. 61-68297[U]
Jan. 13, 1987 [JP] Japan .............................. 62-6857[U]

[51] Int. Cl.[4] ............................................. G03B 17/20
[52] U.S. Cl. .................................... 354/409; 354/474; 354/478; 354/289.12
[58] Field of Search ............ 354/409, 474, 478, 289.12

[56] References Cited

U.S. PATENT DOCUMENTS 4,074,292 2/1978 Nakamoto et al. ................. 354/474
4,149,795 4/1979 Sakurada et al. .................... 354/475
4,529,290 7/1985 Kobori et al. .................. 354/474 X

FOREIGN PATENT DOCUMENTS 60-181738 12/1985 Japan .

Primary Examiner—Michael L. Gellner
Attorney, Agent, or Firm—Fitzpatrick, Cella, Harper & Scinto

[57] ABSTRACT

A display device for use in a photographic camera has a light receiving type display arrangement including a negative type, electro-optically photosensitive panel having a plurality of first segments and a second segment. The first segments comprise groups of display segments each displaying a character. The configuration of the character is varied by controlling the energization of the first segments. The second segment comprises a window-type segment which can be switched between the states of transmitting and shielding light by controlling the energization of the second segment. The display device further includes illuminating members for illuminating the areas of the first and second segments. The illuminating member has a light emitting arrangement for conducting the light from the illuminating member into the second segment.

16 Claims, 7 Drawing Sheets

DISPLAY DEVICE FOR USE IN A PHOTOGRAPHIC CAMERA

BACKGROUND OF THE INVENTION

1. Field of the Invention

The present invention relates to a display device suitable for use in a photographic camera.

2. Description of the Prior Art

It has heretofore been proposed that a liquid crystal display and LED display may be realized in a single display device, this proposal having been disclosed, for example, in Japanese Utility Model Laid-open No. 181738/1985. The proposed prior art enables a display device in which a single display unit is capable of displaying both a liquid crystal display image and a translucent display image which is obtained by illuminating translucent marks or symbols with light emitted from associated light emitting diodes. More specifically, a mask member is superimposed on a liquid crystal display panel on which the liquid crystal display image is formed. The mask member is provided with a liquid crystal display image area and translucent marks or symbols disposed in the form of translucent display windows for forming the translucent display images, the thus-obtained liquid crystal and translucent display images being arranged in a row. In addition, light emitting means employing LEDs is disposed in the vicinity of the mask member in such a manner that illuminating light is transmitted through the translucent display windows.

One problem raised by such a display device is how the space between the liquid crystal display image and the translucent display image can be made narrow so as to display these two images as closely as possible. For example, if the liquid crystal display panel is provided with a laterally elongated liquid crystal display image area with respect to the elongated shape of the mask member, the translucent display image must be separated from the liquid crystal display image by a distance equivalent to the thickness of the portion of the liquid crystal display panel in which the liquid crystal is enclosed. Otherwise the translucent display image may be illuminated by the light transmitted through the liquid crystal display panel. In order to solve the above-described problems, it is also considered that the liquid crystal display panel and the mask member should be formed so as to have substantially the same lateral length, the translucent display image may be illuminated by the light transmitted through the liquid crystal display panel. This method is effective when the liquid crystal employed is of a positive type (in which light is normally transmitted through all portions other than the segment electrodes), but it is impossible to use this method when the liquid crystal is of a negative type (in which light is normally shielded by all the portions other than the segment electrodes). In recent years, the negative type liquid crystal has increasingly been used for the purpose of displaying a clear liquid crystal display image even when the illuminating light is of a low intensity (for example, a variable digit display using characters of a rectangular 8 shape constituted by segment electrodes). In consequence, demand has arisen for development of an arrangement in which it is possible to narrow the space between the translucent display image and the liquid crystal display image formed by the negative type liquid crystal.

SUMMARY OF THE INVENTION

It is therefore an object of the present invention to provide a display device for use in a camera viewfinder or the like which is capable of suitably providing both a display image formed by a negative type display element and a translucent display image formed by the light transmitted through a translucent mark or symbol portion of a mask member or the like.

In accordance with one aspect of the present invention, the display image formed by the aforesaid negative type display element can be disposed in close proximity to the display image transmitted through the translucent mark or symbol portion.

In accordance with another aspect of the present invention, while no translucent display image is being displayed, it is possible to render the light emitted from light emitting means invisible through the viewfinder by shielding the light at the area occupied by the aforesaid translucent display image.

Further objects, features and advantages of the present invention will become apparent from the following description of a preferred embodiment of the present invention with reference to the accompanying drawings.

DESCRIPTION OF THE PREFERRED EMBODIMENT

A preferred embodiment of the present invention will be described below with reference to the accompanying drawings.

Figure 1:
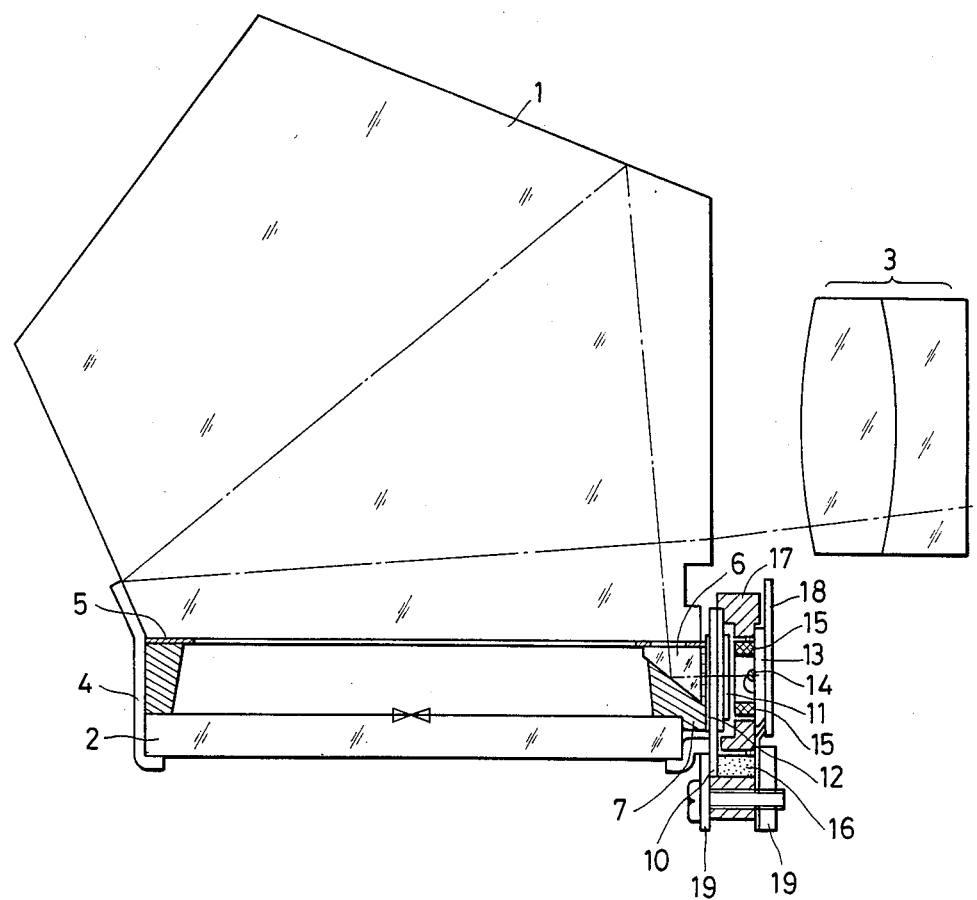
FIG. 1 is a diagrammatic cross-sectional view of a preferred embodiment of a display device in accordance with the present invention, in which the display device is incorporated in the viewfinder of a photographic camera.

FIG. 1 is a cross-sectional view of a display device incorporated in the viewfinder of a single-lens reflex camera in which a liquid crystal panel 10 is disposed in the vicinity of one edge of the lower surface of a pentaprism 1 which is adjacent to an eyepiece lens 3. The image displayed on the liquid crystal panel 10 is illuminated by the light emitted from a light emitting diode (LED) chip 14. The illuminated image is introduced into the pentaprism 1 through the lower surface thereof via a triangular prism 6. A focusing screen 2 is disposed adjacent to the lower surface of the pentaprism 1 and the upper surface of the focusing screen 2 is used as a focusing plane. A holder 4 is disposed so as to hold the pentaprism 1 and the focusing screen 2. A finder frame 5 defines the visual field of the viewfinder. A spacer 7 serves also as a holder for the triangular prism 6. The liquid crystal panel 10 is interposed between polarizing plates 11 and 12 which are arranged in such a manner that the light from an LED chip 14 is transmitted through the plates 11 and 12 in this order. The LED array 14 includes LED chips 14a to 14e which are mounted on an LED substrate 13. A light shielding frame is indicated at 15, and an electrically conductive, resilient connector 16 is disposed between a flexible printed circuit board 18 and the electrode portion of the liquid crystal panel 10. A holder 17 is disposed so as to hold the liquid crystal panel 10 and the LED substrate 13 in the form of one unit. As shown, the holder 17, the printed circuit board 18 and the liquid crystal panel 10 are clamped between a pair of base plates 19 and are fixed by a screw means. The electrically conductive connector 16 provides an electrical connection between the electrically conductive patterns formed on the printed circuit board 18 and the electrode portion of the liquid crystal panel 10.

Figure 2:
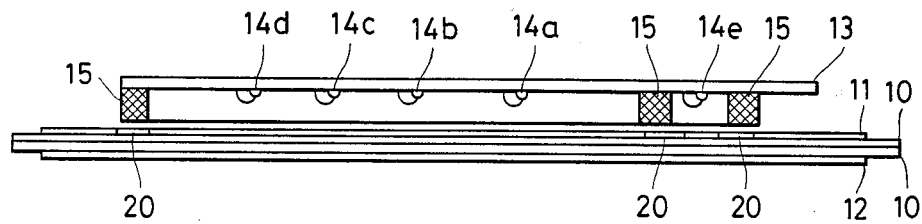
FIG. 2(a) is an enlarged, side elevational view of the display device shown in FIG. 1.
FIG. 2(b) is an enlarged, front elevational view of the display device shown in FIG. 1.
FIG. 2(c) is an enlarged, front elevational view of a portion of the display panel of the display device shown in FIG. 2(b)
Figure 2:
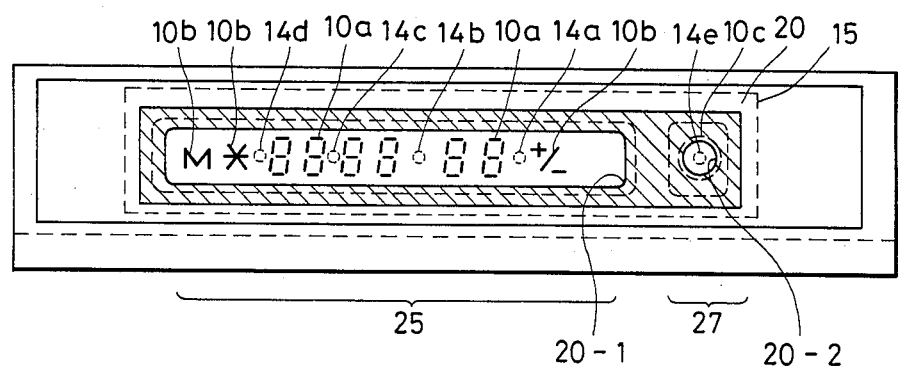
Figure 2:
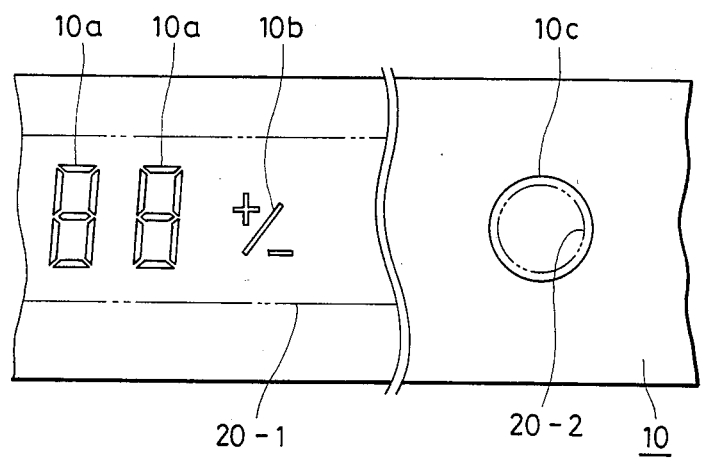

FIGS. 2(a) and 2(b) are enlarged, side and elevational views, respectively, of the liquid crystal panel portion of the display device in the viewfinder shown in FIG. 1. A metal mask 20 is constituted by a mask member deposited on the liquid crystal panel 10, and is formed with a rectangular opening 20-1 and a circular opening 20-2. The rectangular opening 20-1 corresponds to a liquid crystal display image area 25 in which exposure information is displayed while the circular opening 20-2 corresponds to a translucent display image area 27 in which focus information is displayed. The liquid crystal display image area 25 includes a plurality of groups of segments 10a and 10b, the segments 10a and 10b being disposed on the portion of the liquid crystal panel 10 corresponding to the opening 20-1. The respective groups of the segments 10a constitute characters of a rectangular 8 shape so as to display various digits while the respective groups of the segments 10b are arranged to display various marks or symbols. The translucent display image area 27 includes a light transmitting segment 10c having a circular shape and disposed in correspondence with the circular opening 20-1.

FIG. 2(c) shows, on an enlarged scale, one portion of the display panel 10. The respective segments 10a to 10c are formed as shown, and what is most important, the area of the light transmitting segment 10c is greater than the area of the opening 20-2. As is well known, while the respective segments 10a to 10c are de-energized, they shield light in the same manner as all the area other than the are occupied segments 10a to 10c owing to the fact that the segments 10a to 10c have the characteristics of a negative type liquid crystal. When the segments 10a to 10c are energized, they alone transmit light, thereby enabling an operator to read information thus displayed.

The LED chips 14a to 14d formed on the LED substrate 13 are adapted to illuminate the liquid crystal display image area 25 corresponding to the aforesaid opening 20-1. For this reason, as shown in FIG. 2(b), the LED chips 14a to 14d are respectively arranged in such a manner as to be shifted from the positions of the digits and marks and symbols constituted by the respective segments 10a and 10b. The LED chip 14e formed on the LED substrate 13 is constituted by a light emitting element serving as a light source responsible for illuminating a translucent display image. The LED chip 14e is disposed in face-to-face relationship with the light transmitting segment 10c corresponding to the opening 20-2.

The light shielding frame 15 is formed to enclose the areas 25 and 27, thereby preventing the light emitted from the LED chips 14a to 14d from leaking into the area 27 and the light emitted from the LED chip 14e from leaking into the area 25.

Figure 3:
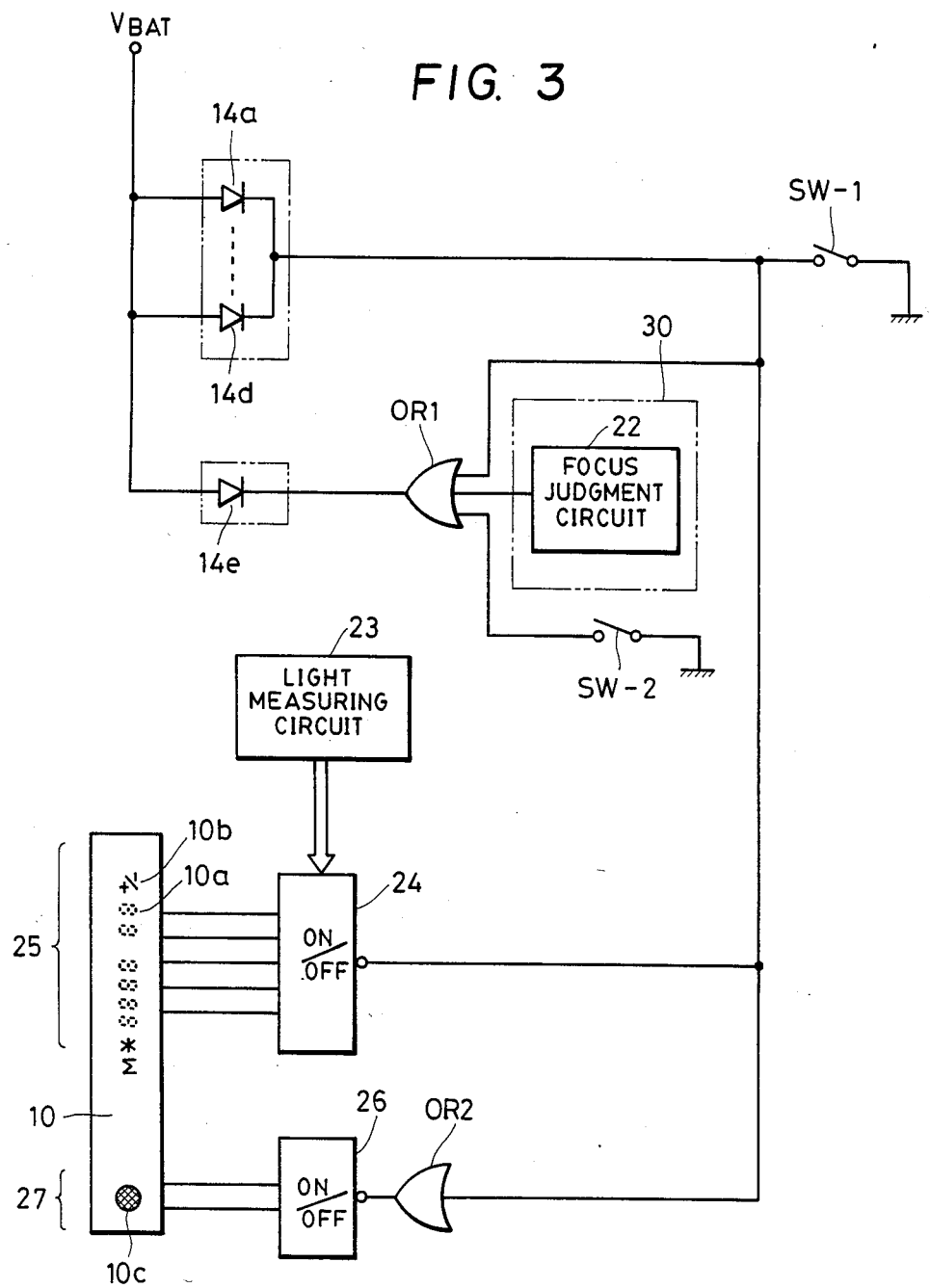
FIG. 3 is a block diagram of a circuit for use with the display device, shown in FIGS. 1 to 2(c)

FIG. 3 is a block diagram of an example of a circuit to which the preferred embodiment of the display device is applied. $V_{BAT}$ represents the source voltage of a camera body. The LED chips 14a to 14d are adapted to illuminate AE (automatic exposure) information displayed in the liquid crystal display image area 25. The LED chips 14a to 14d are connected in parallel, thereby comprising a unit for emitting illuminating light. The LED chip 14e indicates the focus state of the automatic focusing system of the camera. The LED chip 14e is disposed in series between the source voltage $V_{BAT}$ and an OR gate OR1, and is adapted to emit light when the OR gate OR1 outputs a low-level signal. A switch SW-1 is turned on prior to the operation of the display device, and serves as a light measurement switch of a camera. (Typically such a switch is turned on by halfway depressing the shutter release button of the camera.) A switch SW-2 is connected at one end thereof to an input gate of the OR gate OR1, and serves as a selector switch which is turned on when a known automatic focusing device 30 is to be operated and which is turned off when a manual focusing operation is to be selected. A focus judgment circuit 22 is connected to a distance measuring sensor (not shown) of the automatic focusing device 30. The LED chip 14e is responsive to the output of the focus judgement circuit 22.

A light measuring circuit 23 is activated by turning on the light measurement switch SW-1. In response to the signal supplied from the circuit 23, an LCD driver 24 drives the segments 10a and 10b in the liquid crystal display image area 25 for the purpose of displaying various kinds of exposure information such as AE information.

It is to be noted that, when the light measurement switch SW-1 is turned on, the light transmitting segment 10c provided in the translucent display image area 27 is driven or energized by an LED driver 26 for the purpose of indicating the focus state of the optical system of a camera. In consequence, the light transmitting segment 10c assumes a translucent state and light emitted by the LED chip 14e may be transmitted therethrough.

The circuit for driving the display device according to this invention is constructed as described above. Therefore, immediately after the light measurement switch SW-1 has been turned on, the LED chips 14a to 14d, which illuminate the AE information displayed in the liquid crystal display image area 25, and the light transmitting segment 10c are driven at the same time. When the light measurement switch SW-1 is turned on, the LCD driver 24 drives the segments 10a and 10b located in the liquid crystal display image area 25 for displaying exposure information on the basis of the signal supplied from the light measuring circuit 23, thereby displaying exposure information with a slight time lag.

When the selector switch SW-2 of the automatic focusing device 30 is turned on and at the same time, the focus judgment circuit 22 supplies to the OR gate OR1 a low-level output representing the state of in-focus, the LED chip 14e as a focus indicator is caused to emit light. The thus-emitted light is transmitted through the aforesaid light transmitting segment 10c, so that the operator can visually confirm through the viewfinder that the optical system is in focus.

Figure 4:
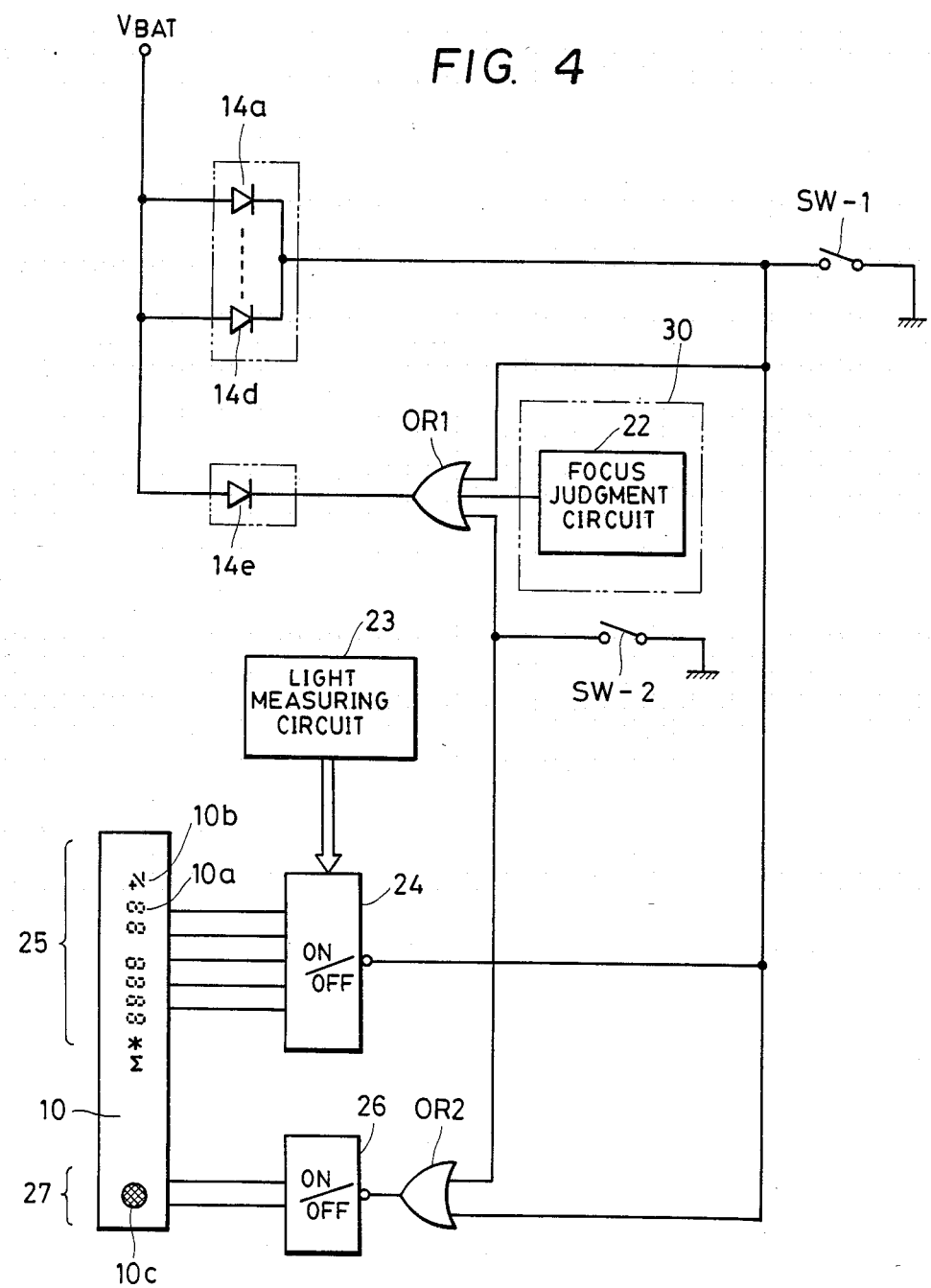
FIG. 4 is a block diagram similar to FIG. 3, but showing another example of a circuit for use with the display device in accordance with the present invention.

FIG. 4 is a block diagram of another example of a circuit to which the preferred embodiment of the display device is applied. The circuit arrangement shown in FIG. 4 differs from the above-described one shown in FIG. 3 in that the output from the selector switch SW-2 of the automatic focusing device 30 is connected not only OR gate OR1 but also to an input terminal of the OR gate OR2. The remaining arrangement is completely identical to that of the previously-described example. Therefore, in FIG. 4, like reference numerals are used to denote like or corresponding circuit elements shown in FIG. 3, and the detailed description of those same elements is omitted here for the sake of simplicity. In this arrangement, when the selector switch SW-2 is turned off, that is, a manual focusing operation is selected, the light transmitting segment 10c provided on the liquid crystal panel 10 is normally de-energized, thereby shielding the light which might pass through the segment 10c. It is therefore possible to positively prevent the light from the AE information illuminating LED chips 14a to 14d from leaking through the segment 10c. In addition, in a case where the operator needs no focus information, if the focus indicating LED chip 14e emits light in response to the low-level signal supplied from the focus judgment circuit 22, such unnecessary light is shielded by the light transmitting segment 10c which is in a de-energized state. In consequence, the light from the LED chip 14e is prevented from leaking through the segment 10c to the viewfinder.

In the above-described embodiment, the light transmitting segment 10c, the LED chip 14e and the associated opening 20-2 comprise, in combination, the translucent display image area 27 in which the configuration of the mark confirmed through the viewfinder is substantially equivalent to that of the opening 20-2 in the metal mask 20. However, the area of the light transmitting segment 10c may be made smaller than that of the opening 20-2, that is, the segment 10c may be located within the area of the opening 20-2, thereby enabling the configuration of the segment 10c to be used as the mark or symbol for providing an indication in the viewfinder.

Moreover, in the above-described embodiment, the LED chip 14e as a light emitting element for forming the translucent display image is disposed immediately behind the rear side of the display panel 10. It is, however, obvious that the LED chip 14e may also be disposed at a location remote from the display panel 10. In this case, the light emitted from the LED chip 14e may be reflected by a reflecting member such as a mirror so as to conduct the emitted light into the segment 10c. The above-described type liquid crystal display is not exclusive. As an example, if any electro-optically photosensitive element is used as the negative type display element, it is, of course, possible to achieve the advantageous effect of the present invention.

As is evident from the description of the preferred embodiment, the present invention succeeds in providing a display device of much practical use in which the translucent display image can be disposed in close proximity to the negative type liquid crystal display image such as information representative of various numerals. In addition, except when the operator takes a picture, the translucent display image area 27 does not transmit any light owing to the fact that the associated light transmitting segment 10c is de-energized. It is therefore possible to prevent the operator from seeing through the area 27 a light emitting element which is not emitting light, in this case the LED chip 14e which is disposed behind the area 27.

Figure 5:
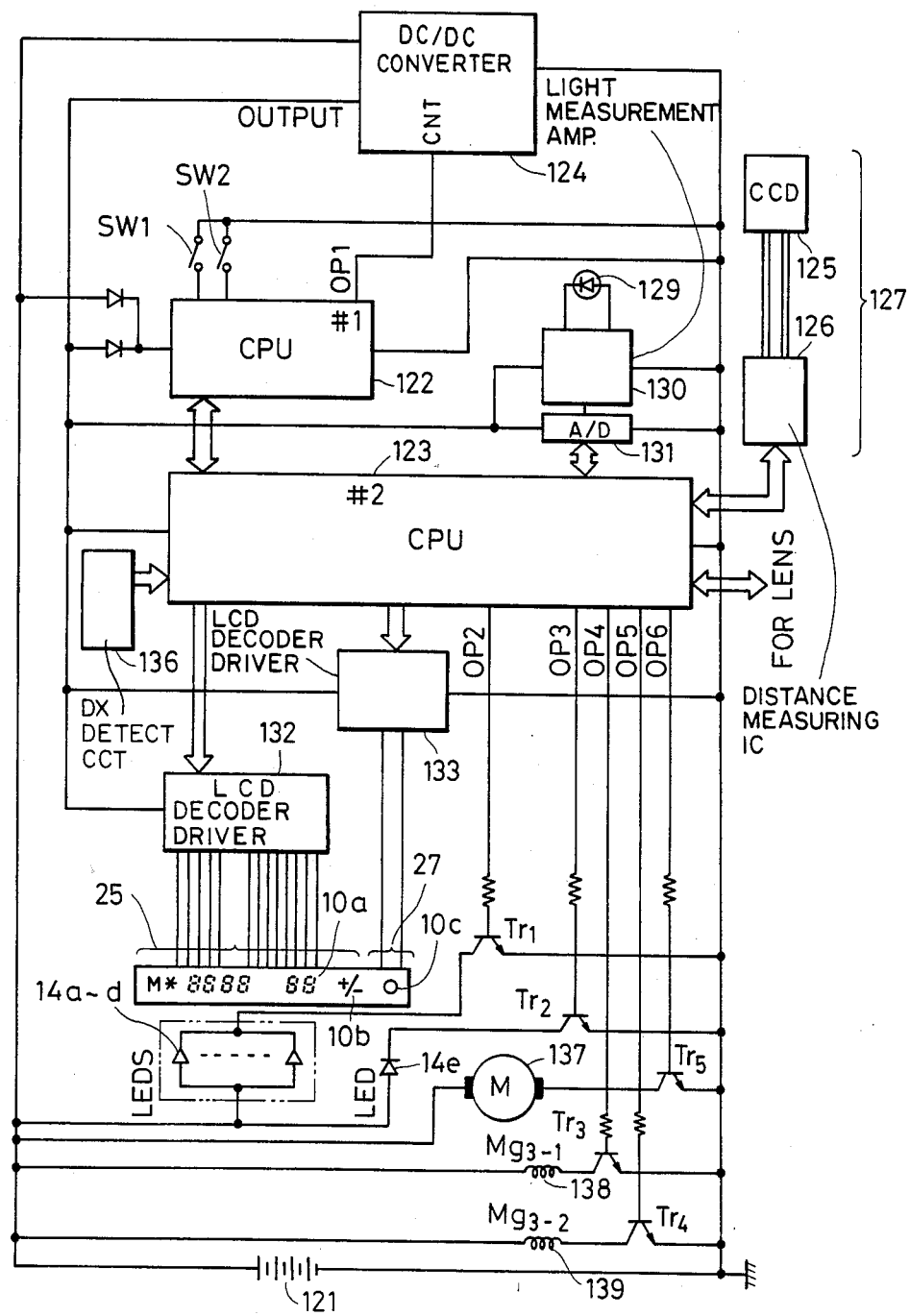
FIG. 5 is a block diagram of an example of the circuit of a camera system incorporating the display device in accordance with the present invention.

FIG. 5 is a block diagram of still another example of the circuit of a camera system to which the preferred embodiment of the display device is applied. In FIG. 5 as well, like reference numerals are used to denote like or corresponding circuit elements shown in the above-described Figures. In the circuit arrangement shown in FIG. 5, a light measurement switch SW1 is turned on prior to the operation of the display device while a release switch SW2 is operated so as to commence exposure control of the camera system. A DC/DC converter 124 is disposed so as to maintain the source voltage supplied from batteries 121 at a level equal to or greater than a predetermined voltage. A microcomputer 122 is disposed so as to judge the respective states of the light measurement switch SW1 and the release switch SW2, and functions to cause the DC/DC converter 124 to generate an output voltage in accordance with the respective states of the switches SW1 and SW2. The voltage output from the DC/DC converter 124 is supplied to a microcomputer 123, an LCD decoder driver 132 and an LCD decoder driver 133 so that they may respectively be driven, the microcomputer 123 serving as a CPU of the camera system and the LCD decoder drivers 132 and 133 being arranged to drive the liquid crystal display panel of the display device. The block of an automatic focus detection circuit is indicated generally at 127, and the block 127 includes a CCD 125 (charge coupled device) serving as a distance measuring sensor and a distance measuring IC 126 for converting the image signal supplied from the CCD 125 from analogue to digital forms. The distance measuring IC 126 transmits to the microcomputer 123 data representative of a distance measurement. In response to the distance measurement data thus supplied, the microcomputer 123 transmits a control signal to the focus adjustment mechanism of a photographic lens (not shown). A light measuring photodiode 129 produces a photoelectric current in accordance with the intensity of external light, and the photoelectric current is subjected to current input - current output logarithm compression in a light measurement amplifier 130. Subsequently, the signal is subjected to A/D conversion in an AD converter 131, and the thus-obtained data representative of the luminance of an object is supplied to the microcomputer 123. Moreover, the microcomputer 123 reads data representative of the speed of a loaded film through a detector 136 for detecting the DX code of the film. On the basis of this data and the aforesaid luminance data, the microcomputer 123 performs arithmetic operations concerning exposure to obtain exposure data required to control the exposure mechanism of the camera system. The LCD decoder driver 132 receives the exposure data from the microcomputer 123, and thereby drives the segments 10a and 10b disposed in the liquid crystal display image area 25 in which such exposure data is displayed. The LCD decoder driver 133 is disposed so as to drive the light transmitting segment 10c formed in the translucent display image area 27 so as to allow the segment 10c to transmit light. The LEDs 14a to 14d for illuminating exposure information are respectively connected in parallel, and constitute one light emitting unit for illuminating the liquid crystal display image area 25. The LED 14e is disposed so as to display the focus state of the automatic focusing mechanism (not shown), and, when transistors $Tr_1$ and $Tr_2$ are turned on in response to an AF (automatic focusing mechanism) drive signal supplied from the microcomputer 123 through output ports OP2 and OP3, the LED 14e emits light. A motor 137 is connected at one end to a transistor $Tr_5$, and is arranged to transport the frames of a loaded film and to cock the shutter (not shown) of the camera system. An electrical magnet 138 is connected at one end to a transistor $Tr_3$, and is arranged to control the start of running down of the front curtain of the shutter (not shown). An electrical magnet 139 is connected at one end to a transistor $Tr_4$, and is arranged to control the start of running down of the rear curtain of the shutter. The respective transistors $Tr_3$, $Tr_4$ and $Tr_5$ are operated by the drive signal supplied from the microcomputer 123 through output ports 4, 5 and 6, and the aforesaid components 137, 138 and 139 are respectively driven with the transistors $Tr_5$, $Tr_3$ and $Tr_4$ being turned ON, thereby enabling transportation of the frames of the loaded film and control of the shutter operation.

Figure 6:
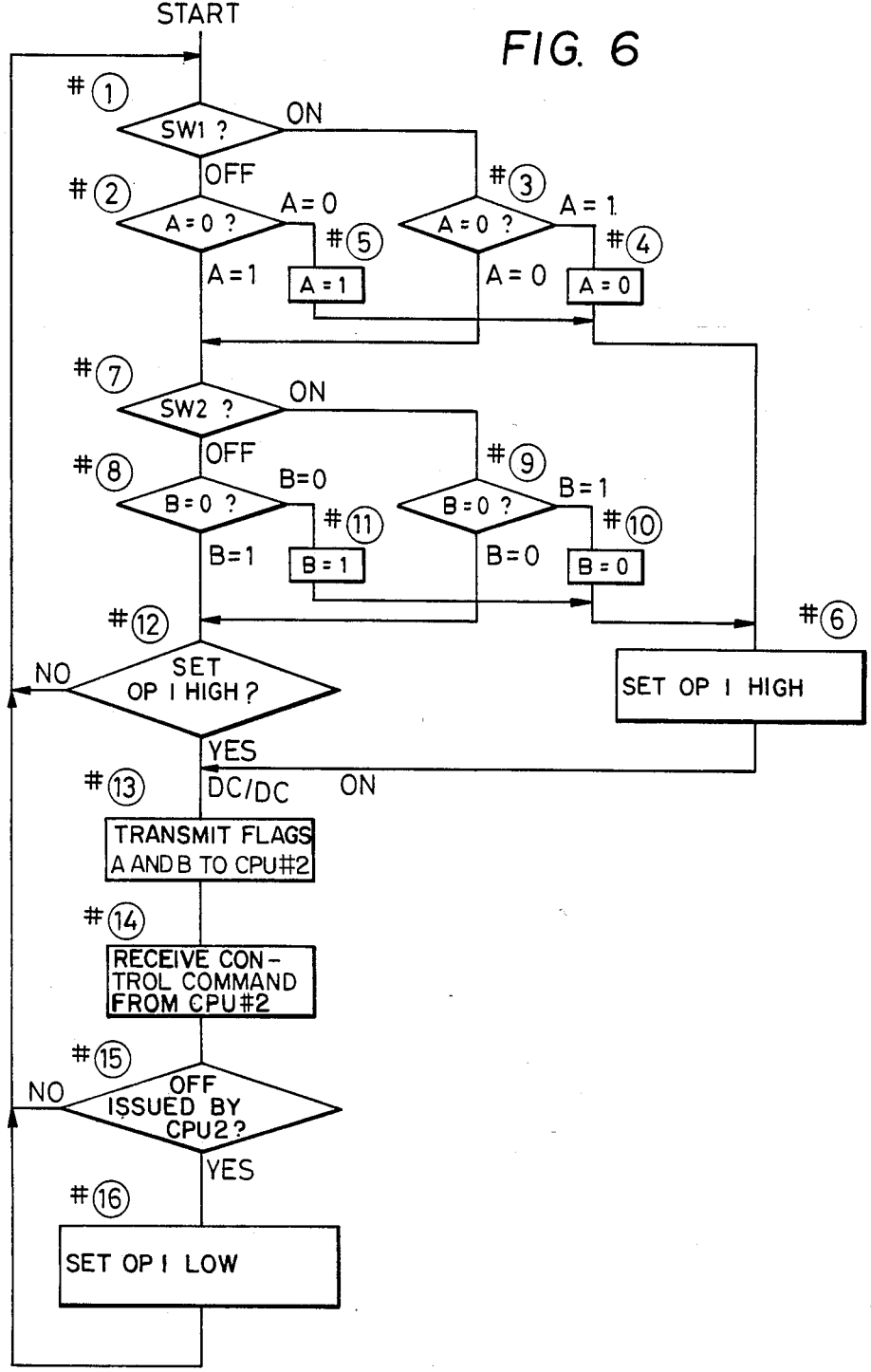
FIG. 6 is a flow chart showing a sequence of the operations of a microcomputer incorporated in the circuit shown in FIG. 5.
Figure 7:
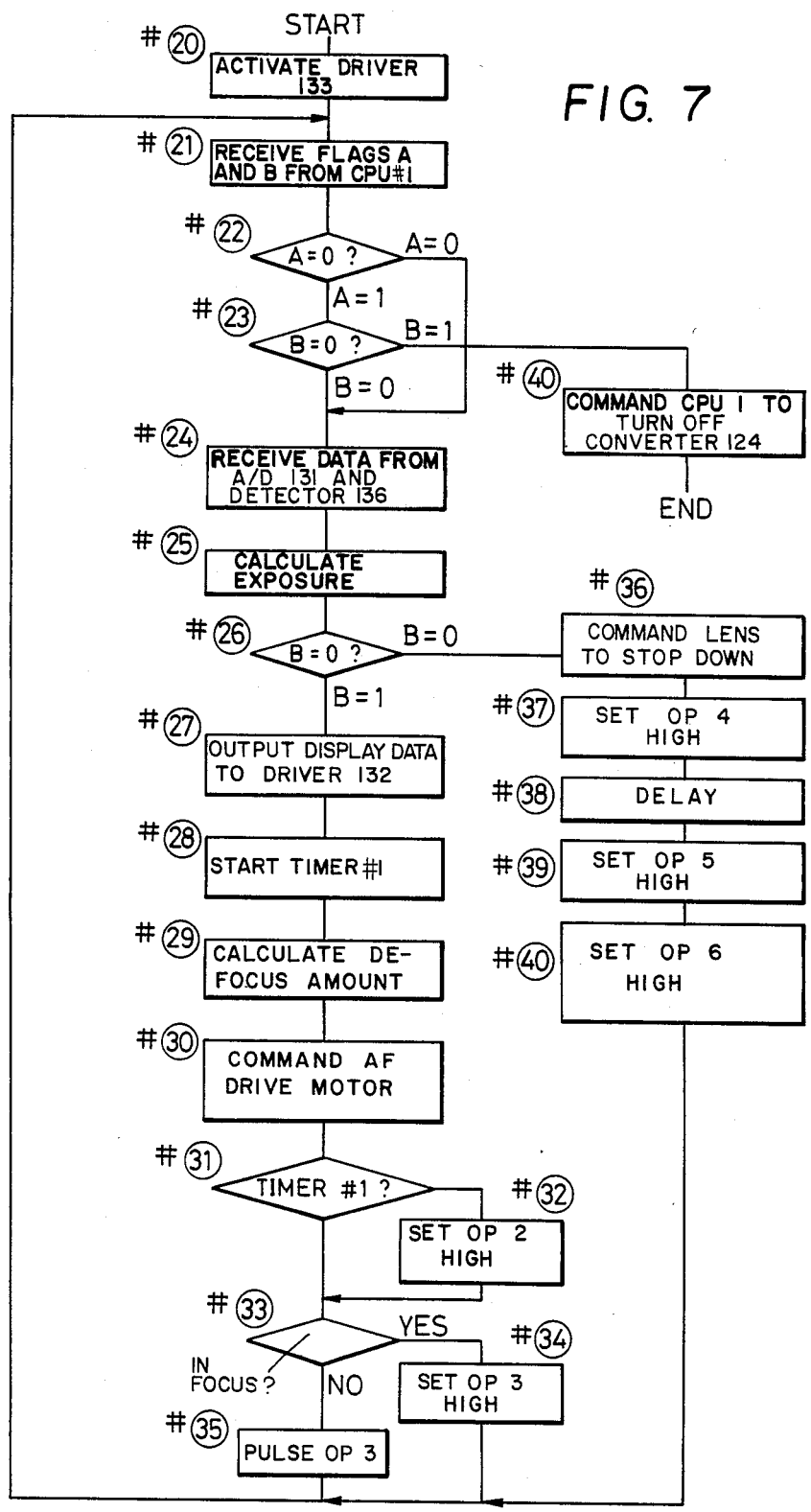
FIG. 7 is a flow chart showing a sequence of the operations of another microcomputer incorporated in the circuit shown in FIG. 5.

FIGS. 6 and 7 are respectively flow charts of the control operations of the microcomputers 122 and 123 incorporated in the aforesaid camera system. The operation of the circuit of the camera system will be described below with reference to FIGS. 6 and 7.

Referring to FIG. 6 showing the flow chart of a sequence of the operations of the microcomputer 122, the microcomputer 122 first judges the states of the aforesaid switches SW1 and SW2. In Step 1, if it is detected that the switch SW1 is turned on, the process proceeds to Step 3. In Step 3, if a flag A representing the state of the switch SW1 is "0" (i.e., SW1 is turned on), the process proceeds to Step 6 while, if the flag A is "1" (i.e., SW2 is turned off), the process proceeds to Step 4 in which the flag A is set to "0". The process further proceeds to Step 6.

On the other hand, in Step 1, if it is detected that the switch SW1 is turned off, the process proceeds to Step 2. In Step 2, if the flag A is "1" (i.e., SW1 is turned off), the process proceeds to Step 7 while, if the flag A is "0" (i.e., SW1 is turned on), the process proceeds to Step 5. In Step 5, the flag A is set to "1" and the process proceeds to Step 6.

In Step 7, if it is detected that the switch SW2 is turned on, the process proceeds to Step 9 while, if it is detected that the switch SW2 is turned off, the process proceeds to Step 8. In Step 9, if a flag B representing the state of the switch SW2 is "0" (i.e., SW2 is turned on), the process proceeds to Step 12 while, if the flag B is "1" (i.e., SW2 is turned off), the process proceeds to Step 10 in which the flag B is set to "0". The process further proceeds to Step 6.

In Step 6, the output at the output port OP1 of the microcomputer 122 is set to a high level and the DC/DC converter 124 is thereby turned on.

On the other hand, in Step 7, if it is detected that the switch SW2 is turned off, the process proceeds to Step 8. In Step 8, if the flag B is "1" (i.e., SW2 is turned off), the process proceeds to Step 12 while, if the flag B is "0" (i.e., SW2 is turned on), the process proceeds to Step 11 in which the flag B is set to "1". The process proceeds to Step 6.

In Step 12, judgement is made as to the state of the output port OP1 of the microcomputer 122. While a high-level output is being developed at the output port OP1, the process proceeds to Step 13, but, while a low-level output is being developed at the output port OP1, the process returns to Step 1.

In Step 13, the microcomputer 122 transmits the respective contents of the flags A and B to the microcomputer 123 which has previously been activated.

In Step 14, the microcomputer 122 receives from the microcomputer 123 a control command relative to the DC/DC converter 124.

In Step 15, if the microcomputer 123 issues an OFF command to have the DC/DC converter 124 turned off, the process proceeds to Step 16 while, if the microcomputer 123 issues no OFF command, the process returns to Step 1.

In Step 16, since the microcomputer 123, as described in Step 15, issues the OFF command for the DC/DC converter 124 to be turned off, the microcomputer 122 provides a low-level signal at the output port OP1, to turn off the DC/DC converter 124. Subsequently, the process returns to Step 1.

Referring to FIG. 7, the operation of the microcomputer 123 will be described below.

The microcomputer 123 provided with the operation sequence shown in FIG. 7 is supplied with electrical power by the DC/DC converter 124 controlled by the microcomputer 122 described above with reference to FIG. 6, and thus the operation of the microcomputer 123 is initiated.

In Step 20, the microcomputer 123 is supplied with electrical power by the DC/DC converter 124, and first issues a command that the LCD decoder driver 133 be activated. The LCD decoder driver 133 drives the light transmitting segment 10c disposed in the translucent display image area 27, so that the segment 10c which is made of a negative type liquid crystal is allowed to assume the light transmitting state.

In Step 21, the microcomputer 123 communicates with the microcomputer 122 and receives the data of the flags A and B representative of the respective states of the switches SW1 and SW2.

In Step 22, the flag A representing the state of the switch SW1 is checked. If A="0" which means that the switch SW1 is turned on, the process proceeds to Step 24. If A="1" which means that the switch SW1 is turned on, the process proceeds to Step 23.

In Step 23, the flag B representing the state of the switch SW2 is checked. If B="0" which means that the switch SW2 is turned on, the process proceeds to Step 24. If B="1" which means that the switch SW2 is turned off, the process proceeds to Step 40 in which the microcomputer 123 gives the microcomputer 122 a command that the DC/DC converter 124 be turned off (not be driven), thereby effecting END processing.

In Step 24, the microcomputer 123 receives from an A/D converter 131 data representative of the luminance of an object to be photographed and data representative of the film speed of a loaded film from the detector 136 for detecting the DX code of the film.

In Step 25, the microcomputer 123 performs arithmetic operations concerning exposure on the basis of the luminance data, the film speed data, data representing the selection of photographic modes of the camera system and various other data representing photographic value settings. When a programmed control is selected, the microcomputer 123 determines a shutter speed and an aperture value. In the case of shutter-priority AE, the microcomputer 123 determines an aperture value while, in the case of aperture-priority AE, it determines a shutter speed.

In Step 26, the microcomputer 123 checks the flag B representing the state of the switch SW2 used for detecting a shutter release operation. If the flag B is "1" (i.e., SW2 is turned off), the process proceeds to Step 27 while, if the flag B is "0" (i.e., SW2 is turned on), the process proceeds to Step 36. In a normal operation, after commencement of the operation of the microcomputer 123, the flag B is set to "1", and the process of the flow chart first proceeds to Step 27. Therefore, the process starting at Step 27 will be explained by way of example.

In Step 27, the microcomputer 123 outputs display data (for example, the aperture value calculated in Step 25) to the LCD decoder driver 132, and drives the respective segments 10a and 10b disposed in the liquid crystal display image area 25 in which exposure information is displayed.

In Step 28, a timer #1 is started.

In Step 29, the microcomputer 123 communicates with the distance measuring IC 126, and calculates the amount of de-focus of the photographic lens (not shown).

In Step 30, the microcomputer 123 issues to the photographic lens a command for an AF drive motor incorporated therein to be rotated to perform a focusing operation.

In Step 31, the passage of time of the timer #1 is checked. If 100 ms has elapsed, the process proceeds to Step 32, but, if 100 ms has not yet elapsed, the process proceeds to Step 33.

In Step 32, the microcomputer 123 provides a high-level signal at its output port OP2 so as to turn on the transistor $Tr_1$, thereby causing emission of the LEDs 14a to 14d for illuminating the exposure information. This enables the operator to visually confirm through the viewfinder the display pattern formed by the segments 10a and 10b disposed in the liquid display image area 25.

In Step 33, detection is made as to whether or not the photographic lens is in focus. If it is in focus, the process proceeds to Step 34, but, if it is out of focus, the process proceeds to Step 35.

In Step 34, the microcomputer 123 provides a high-level signal at its output port OP3 so as to turn on the transistor $Tr_2$, thereby causing emission of the LED 14e for displaying the state of focus. The thus-emitted light is transmitted through the segment 10c which has previously been driven so as to transmit light, and thus the translucent display image is displayed in the opening 20-2 formed in the metal mask 20. This enables the operator to visually confirm the state of focus through the viewfinder.

In Step 35, the microcomputer 123 outputs a pulse signal to the output port OP3 to repetitively turn on and off the transistor $Tr_2$, thereby intermittently flashing the focus indicating LED 14e. The thus-emitted light is transmitted as a flashing translucent display image through the segment 10c provided in the opening 20-2 formed in the metal mask 20, and this enables the operator to visually confirm the state of focus through the viewfinder.

The process in Steps 27 to 35 is characterized in that, in order to display the states of in-focus, non-focusing and out-of-focus, the focus indicating LED 14e is respectively turned on, off, and flashed intermittently so as to vary the displayed state of the translucent display image formed by the segment 10c whereas the exposure information displaying LEDs 14a to 14d function to illuminate the liquid crystal segments 10a and 10b. Accordingly, focus indication which normally requires quick response is provided by the LED independently of the limitations imposed by the characteristics of the liquid crystal employed. This prevents slowing of display response at a low temperature, and in addition, complex display of exposure information is achieved in the liquid crystal image display area.

It is to be noted that, after the process has passed Steps 27 to 35, it returns to Step 21 and the same steps are repeated. Therefore, the operator can visually confirm through the viewfinder exposure information and focus information which normally reflect the latest photographic situation such as variations in the luminance of an object.

After the operator has confirmed exposure information and focus information through the viewfinder, he/she proceeds to a photographic operation. Specifically, the shutter release button is fully depressed to its stroke end, so that the switch SW2 is turned on and the flag B is forced to the "0" state, thereby performing the process starting in Step 36.

In Step 36, the microcomputer 123 outputs a command to the photographic lens so that a diaphragm drive motor built in the barrel of the lens may be driven to stop down the lens to the aperture value calculated in Step 25.

In Step 37, after the lens has been stopped down and a quick return mirror has been pivoted to its upper position, the microcomputer 123 outputs a high-level signal to the output port OP4 for a predetermined period of time (for example, 10 ms). During this time, the transistor $Tr_3$ is turned on to drive the electrical magnet 138 so as to start the running down of the front curtain of the shutter, thereby initiating exposure of one frame of the loaded film.

In Step 38, the microcomputer 123 waits for the next operation for a period of time equivalent to the shutter speed calculated in Step 25.

In Step 39, the microcomputer 123 outputs a high-level signal to the output port OP5 for a predetermined period of time (for example, 10 ms). During this time, the transistor $Tr_4$ is turned on to drive the electrical magnet 139 so as to start the start of running down of the the rear curtain of the shutter, thereby completing exposure of the frame.

In Step 40, the microcomputer 123 outputs a high-level signal to the output port OP6 for a predetermined period of time (for example, 300 ms). During this time, the transistor $Tr_5$ is turned on to drive the motor 137 used for film winding and shutter cocking, and thus waits for the exposure of the succeeding frame.

Subsequently, each time the operator turns on the switch SW2 in order to take a picture, the aforesaid sequence of Steps 36 to 40 is repeated.

As described above, in the preferred embodiment, the translucent display image is formed in the light transmitting area occupied by the liquid crystal segment of the negative type which is driven to display a liquid crystal image. Therefore, since no liquid crystal is enclosed between the liquid crystal display image and the translucent display image, both of them can be disposed in close proximity to each other. In addition, in this embodiment, the negative type liquid crystal segment is driven in order to display the translucent display image in the light transmitting area. In practice, the negative type liquid crystal segment is first driven prior to the lighting up of the light emitting element for generating light which illuminates the translucent display image, and subsequently the segment is continuously driven, so that the translucent display image is illuminated by controlling emission of the light emitting element. Accordingly, the present invention succeeds in providing a display device of a type which enables quick-response display independently of the response of the liquid crystal which might become low under low temperature conditions.

What is claimed is:

1. A display device for use in a photographic camera, comprising:
   (a) light receiving display means including a negative type, electro-optically photosensitive panel having a plurality of first segments occupying a first area of said panel and a second segment occupying a second area of said panel, said first segments comprising groups of display segments each displaying a character the configuration of which is varied by controlling the energization of said first segments, said second segment comprising a window-type segment which can be switched between the states of transmitting light and shielding light by controlling the energization of said second segment; and
   (b) illuminating means for illuminating the areas occupied by said first segments and said second segment, said illuminating means including a light emitting arrangement for conducting the light from said illuminating means into the area occupied by said second segment.

2. A device according to claim 1 further comprising a mask arrangement having an opening at a location corresponding to the area of said second segment.

3. A device according to claim 1, wherein said electro-optically photosensitive panel is a liquid crystal panel.

4. A device according to claim 1, wherein said illuminating means has a light emitting structure which is disposed in face-to-face relationship with said electro-optically photosensitive panel.

5. A device according to claim 4, wherein said light emitting structure includes first light emitting means for illuminating the area of said first segments and second light emitting means for illuminating the area of said second segment.

6. A device according to claim 5 further comprising a pentaprism for reflecting light from an object to be photographed toward a viewfinder so as to allow for an operator's observation of the light through said viewfinder, and wherein said electro-optically photosensitive panel and said light emitting arrangement are disposed in a vicinity of said pentaprism.

7. A device according to claim 1 further comprising a pentaprism for reflecting light from an object to be photographed toward a viewfinder so as to allow for an operator's observation of the object though said viewfinder, and wherein said electro-optically photosensitive panel and said light emitting arrangement are disposed in a vicinity of said pentaprism.

8. A device according to claim 1 further comprising:
   (a) a first circuit for causing said first segments to provide an indication based on light measurement information;
   (b) a second circuit for driving said second segment; and
   (c) a third circuit for controlling the emission of said light emitting arrangement on the basis of distance measurement information.

9. A device according to claim 8 further comprising a switch wherein said second circuit is adapted to drive said second segment on the basis of the operation of said switch for starting said first circuit in a controlled manner.

10. A display device for use in a photographic camera, comprising:
    (a) a light receiving type display means including a negative type, electro-optically photosensitive panel having a plurality of first segments occupying a first area of said panel and a second segment occupying a second area of said panel, said first segments comprising groups of display segments each displaying an image, the configuration of which is varied by controlling the energization of said first segments, said second segment comprising a window-type segment which can be switched between the states of transmitting light and shielding light by controlling the energization of said second segment;
    (b) illuminating means for illuminating the areas of said first segments and said second segment, said illuminating means including a first light emitting means for illuminating the area of said first segments and a second light emitting means for illuminating the area of said second segment, said first and second light emitting means being disposed in face-to-face relationship with said electro-optically photosensitive panel; and
    (c) a light shielding member disposed between said first light emitting means and the area of said second segment, said light shielding member being arranged to prevent the light emitted by said first light emitting means from leaking into the area of said second segment.

11. A device according to claim 10, wherein said electro-optically photosensitive panel is a liquid crystal panel, said respective first and second light emitting means being light emitting diodes.

12. A device according to claim 10, wherein said first light emitting means and said second light emitting means are disposed on a common base plate, said base plate being disposed in face-to-face relationship with said electro-optically photosensitive panel.

13. A device according to claim 12, wherein said light shielding member is disposed between said base plate and said electro-optically photosensitive panel.

14. A device according to claim 13, wherein said light shielding member is formed to enclose the area of said first segments.

15. A display device comprising:
    (a) light receiving display means including a negative type, electro-optically photosensitive panel having a plurality of first segments occupying a first area of said panel and a second segment occupying a second area of said panel, said first segments comprising groups of display segments each displaying a character the configuration of which is varied by controlling the energization of said first segments, said second segment comprising a window-type segment which can be switched between the states of transmitting light and shielding light by controlling the energization of said second segment;

(b) illuminating means for illuminating the areas occupied by said first segments and said second segment, said illuminating means including a light emitting arrangement for conducting the light from said illuminating means into the area occupied by said second segment; and (c) control means for driving said second segment in a controlled manner so as to cause said second area to serve as a translucent display image area prior to activation of said light emitting arrangement.

16. A device according to claim 15 further comprising:

(a) a first circuit for causing said first segments to provide an indication based on light measurement information;

(b) a second circuit for driving said second segment; and (c) a third circuit for controlling the emission of said light emitting arrangement on the basis of distance measurement information.

* * * * *

UNITED STATES PATENT AND TRADEMARK OFFICE
CERTIFICATE OF CORRECTION

PATENT NO. : 4,788,569

DATED : November 29, 1988

INVENTOR(S) : Yamada, et al.

It is certified that error appears in the above-identified patent and that said Letters Patent is hereby corrected as shown below:

COLUMN 2:

Line 41, "device," should read --device--.

COLUMN 3:

Line 56, "are occupied" should read --area occuied by--.

COLUMN 4:

Line 48, "LED driver 26" should read --LCD driver 26--.

COLUMN 5:

Line 16, "only OR gate OR1" should read --only to OR gate OR1--.

COLUMN 8:

Line 51, "turned on," should read --turned off,--.

UNITED STATES PATENT AND TRADEMARK OFFICE
CERTIFICATE OF CORRECTION

PATENT NO. : 4,788,569

DATED : November 29, 1988

INVENTOR(S) : Yamada, et al.

It is certified that error appears in the above-identified patent and that said Letters Patent is hereby corrected as shown below:

COLUMN 10:

Line 51, "start of" should be deleted.
    Line 52, "the" should be deleted (first occurrence).

COLUMN 12:

Line 16, "(a) a light receiving type display means" should read --(a) light receving display means--.

Signed and Sealed this

Fourteenth Day of November, 1989

Attest:

JEFFREY M. SAMUELS

Attesting Officer      Acting Commissioner of Patents and Trademarks